US012576622B2

(12) United States Patent
Saito et al.

(10) Patent No.: US 12,576,622 B2
(45) Date of Patent: Mar. 17, 2026

(54) SHEET FOR PACKAGING ELECTRONIC PART

(71) Applicant: DENKA COMPANY LIMITED, Tokyo (JP)

(72) Inventors: Takeshi Saito, Tokyo (JP); Ikuka Inoda, Tokyo (JP); Ryosuke Yanaka, Tokyo (JP)

(73) Assignee: DENKA COMPANY LIMITED, Tokyo (JP)

( * ) Notice: Subject to any disclaimer, the term of this patent is extended or adjusted under 35 U.S.C. 154(b) by 381 days.

(21) Appl. No.: 18/269,817

(22) PCT Filed: Dec. 14, 2021

(86) PCT No.: PCT/JP2021/046064
§ 371 (c)(1),
(2) Date: Jun. 27, 2023

(87) PCT Pub. No.: WO2022/149420
PCT Pub. Date: Jul. 14, 2022

(65) Prior Publication Data
US 2024/0059053 A1 Feb. 22, 2024

(30) Foreign Application Priority Data
Jan. 8, 2021 (JP) ................................. 2021-001936

(51) Int. Cl.
*B32B 27/08* (2006.01)
*B32B 27/30* (2006.01)

(52) U.S. Cl.
CPC ............ *B32B 27/08* (2013.01); *B32B 27/302* (2013.01); *B32B 27/308* (2013.01); *B32B 2250/24* (2013.01); *B32B 2250/42* (2013.01); *B32B 2250/44* (2013.01); *B32B 2307/7376* (2023.05); *B32B 2553/00* (2013.01)

(58) Field of Classification Search
CPC ..... B32B 27/08; B32B 27/302; B32B 27/308; B32B 2250/24; B32B 2250/42; B32B 2250/44; B32B 2307/7376; B32B
2553/00; B32B 27/365; B65D 65/40; B65D 75/36; B65D 85/38; B65D 2585/86; H01L 21/00
See application file for complete search history.

(56) References Cited

U.S. PATENT DOCUMENTS

| | | | |
|---|---|---|---|
| 2013/0251970 A1 | 9/2013 | Aoki et al. | |
| 2016/0368176 A1 | 12/2016 | Kasai | |

FOREIGN PATENT DOCUMENTS

| CN | 1524681 | A | 9/2004 |
|---|---|---|---|
| CN | 1824585 | A | 8/2006 |
| CN | 106062947 | A | 10/2016 |
| CN | 106604878 | A | 4/2017 |
| JP | H09-174769 | A | 7/1997 |
| JP | 2002-292805 | A | 10/2002 |
| JP | 2003-170547 | A | 6/2003 |
| JP | 2004-91691 | A | 3/2004 |
| JP | 2008-74408 | A | 4/2008 |
| JP | 2011-001074 | A | 1/2011 |
| JP | 2011-111171 | A | 6/2011 |
| JP | 2017-205941 | A | 11/2017 |
| JP | 2019-094387 | A | 6/2019 |
| KR | 10-2008-0041960 | A | 5/2008 |
| WO | 2006/030871 | A1 | 3/2006 |
| WO | 2012/046807 | A1 | 4/2012 |

OTHER PUBLICATIONS

English machine translation for JP2008-074408. (Year: 2008).*
English machine translation for JP2017-205941. (Year: 2017).*
Mar. 1, 2022 International Search Report issued in International Patent Application No. PCT/JP2021/046064.

* cited by examiner

*Primary Examiner* — Michael C Miggins
(74) *Attorney, Agent, or Firm* — Oliff PLC

(57) ABSTRACT

An electronic device packaging sheet including a substrate sheet having at least one substrate layer including: a thermoplastic resin (I); and a resin (II) which includes at least one copolymer selected from a (meth)acrylic acid alkyl ester copolymer (A) and a styrene-acrylonitrile copolymer (B) that have a weight-average molecular weight of 700,000-4,300,000. The substrate sheet has at least one substrate layer comprising the thermoplastic resin (I) at 70-99 mass % and the resin (II) at 1-30 mass %.

20 Claims, No Drawings

SHEET FOR PACKAGING ELECTRONIC PART

TECHNICAL FIELD

The present invention relates to a sheet for packaging an electronic part.

BACKGROUND

Trays (injection trays, vacuum-molded trays, etc.), magazines, and carrier tapes (embossed carrier tapes), etc., are used as packaging containers for semiconductors and electronic devices, in particular, for integrated circuits (IC) and electronic devices comprising an IC, etc. Polystyrene-based resins, ABS-based resins, polyvinyl chloride-based resins, polypropylene-based resins, polyester-based resins, polyphenylene ether-based resins, and polycarbonate-based resins, etc., are used as thermoplastic resins constituting the packaging containers for the foregoing electronic devices. Further, from the viewpoint of avoiding IC damage or breakage due to static electricity, there have also been proposed, for example, packaging containers which have, provided to a surface of a substrate layer comprising an ABS-based resin, for example, a conductive layer comprising a resin with a conductive agent such as conductive carbon black blended therein (Patent Documents 1 and 2, etc.).

The trays and carrier plates mentioned above are obtained by using a publicly-known method to mold a sheet for packaging electronic devices. However, at the time of molding, in particular, when slitting an original sheet or when punching out sprocket holes, etc., fluffs and burrs may be generated. Such fluffs and burrs sometimes cause faults in electronic devices by falling into accommodation sections (pockets) and adhering to the electronic devices. In recent years, accompanying the miniaturization of electronic devices, there is stronger demand for a reduction in faults caused by burrs or fluffs adhering to electronic devices.

To address the foregoing problem, sheets have been proposed in which a polyolefin, a styrene-butadiene-styrene block copolymer, or a styrene-ethylene-butylene-styrene block copolymer is blended in a substrate layer or a conductive layer to reduce burrs and fluffs (for example, Patent Documents 3 and 4, etc.). However, in conventional methods, burrs and fluffs are not sufficiently inhibited.

CITATION LIST

Patent Literature

Patent Document 1: JP H9-174769 A
Patent Document 2: JP 2002-292805 A
Patent Document 3: WO 2006/030871 A
Patent Document 4: JP 2003-170547 A

SUMMARY OF INVENTION

Technical Problem

Here, the objective of the present invention is to provide: an electronic device packaging sheet which can effectively inhibit the generation of fluffs and burrs; and a molded article comprising the sheet.

Solution to Problem

To address the problem described above, the present inventors carried out diligent research which resulted in the discovery that the problem can be solved by an electronic device packaging sheet provided with a substrate sheet having one or more substrate layers in which a thermoplastic resin (I) is combined with a resin (II) including at least one copolymer selected from high molecular weight (meth) acrylic acid ester copolymers and styrene-acrylonitrile copolymers, and thus, were able to complete the present invention.

That is, the present invention has the following embodiments.

[1] An electronic device packaging sheet including a substrate sheet having at least one substrate layer including: a thermoplastic resin (I); and a resin (II) which includes at least one copolymer selected from a (meth)acrylic acid alkyl ester copolymer (A) and a styrene-acrylonitrile copolymer (B) that have a weight-average molecular weight of 700,000-4,300,000.

[2] The electronic device packaging sheet described in (1), wherein the substrate sheet has at least one substrate layer including the thermoplastic resin (I) at 70-99 mass % and the resin (II) at 1-30 mass %.

[3] The electronic device packaging sheet described in (1) or (2), wherein the (meth)acrylic acid ester copolymer (A) includes an acrylic acid alkyl ester monomer unit (a1) having an alkyl group with a carbon number of 4-8.

[4] The electronic device packaging sheet described in any one of (1) to (3), wherein the thermoplastic resin (I) includes at least one thermoplastic resin selected from an ABS-based resin and a PC-based resin.

[5] The electronic device packaging sheet described in any one of (1) to (4), wherein the thermoplastic resin (I) includes an ABS-based resin at 70-100 mass % with respect to the total mass of the thermoplastic resin (I).

[6] The electronic device packaging sheet described in any one of (1) to (5), wherein the substrate sheet has at least one dividing layer which divides the substrate layer.

[7] The electronic device packaging sheet described in (6), wherein the average value of the thickness of an individual substrate layer is equal to or greater than the average value of the thickness of an individual dividing layer.

[8] A molded article comprising the electronic device packaging sheet described in any one of (1) to (7).

[9] The molded article described in (8), wherein the molded article is a container.

[10] The molded article described in (8), wherein the molded article is a carrier tape.

Effects of Invention

According to the present invention, it is possible to provide: an electronic device packaging sheet which can effectively inhibit the generation of fluffs and burrs; and a molded article comprising the sheet.

DESCRIPTION OF EMBODIMENTS

The present invention shall be explained in more detail below, but the present invention is not limited to the following embodiments.

[Electronic Device Packaging Sheet]

The electronic device packaging sheet according to the present invention (hereinafter also referred to as simply the "sheet") includes a substrate sheet having at least one substrate layer including: a thermoplastic resin (I); and a resin (II) which includes at least one copolymer selected from a (meth)acrylic acid alkyl ester copolymer (A) and a styrene-acrylonitrile copolymer (B) that have a weight-average molecular weight of 700,000-4,300,000. The electronic device packaging sheet according to the present invention having such a configuration can effectively inhibit the generation of fluffs and burrs.

(Substrate Sheet)

The electronic device packaging sheet according to the present invention is provided with a substrate sheet. The substrate sheet has at least one substrate layer including: a thermoplastic resin (I); and a resin (II) which includes at least one copolymer selected from a (meth)acrylic acid alkyl ester copolymer (A) and a styrene-acrylonitrile copolymer (B) that have a weight-average molecular weight of 700,000-4,300,000.

<Substrate Layer>

The substrate layer includes: a thermoplastic resin (I); and a resin (II) which includes at least one copolymer selected from a (meth)acrylic acid alkyl ester copolymer (A) and a styrene-acrylonitrile copolymer (B) that have a weight-average molecular weight of 700,000-4,300,000.

The ratio of the thermoplastic resin (I) included in the substrate layer is preferably 70-99 mass %, more preferably 75-98 mass %, and particularly preferably 80-96 mass % with respect to the total mass of the resin composition constituting the substrate layer. Further, the ratio of the resin (II) included in the substrate layer is preferably 1-30 mass %, more preferably 2-25 mass %, and particularly preferably 4-20 mass % with respect to the total mass of the resin composition constituting the substrate layer. By providing at least one substrate layer including the thermoplastic resin (I) and the resin (II) within the ranges described above, it becomes easy to inhibit the generation of burrs and fluffs during sheet molding more effectively.

The mass ratio of the thermoplastic resin (I) to the resin (II) in the substrate layer (thermoplastic resin (I)/resin (II)) is preferably 99/1-70/30 and more preferably 98/4-75/25. If the mass ratio of the thermoplastic resin (I) to the resin (II) is within the ranges described above, the film formability of the substrate sheet does not readily decrease and it becomes easier to effectively inhibit the generation of burrs and fluffs.

(Thermoplastic Resin (I))

Examples of the thermoplastic resin (I) include polystyrene-based resins (PS-based resins), ABS-based resins, polyester-based resins, and polycarbonate-based resins (PC-based resins), etc. These resins may be used alone or as a combination of two or more.

Examples of the PS-based resins include polystyrene resins and rubber-modified styrene resins (rubber-g-styrene-based resins (GPPS) or high-impact styrene resins (HIPS)), etc. The PS-based resin may be used alone or as a combination of two or more.

Examples of aromatic vinyl monomers for forming a PS-based resin include styrene, alkyl-substituted styrenes (for example, vinyl toluene, vinyl xylene, p-ethylstyrene, p-isopropylstyrene, butylstyrene, p-t-butylstyrene, etc.), halogen-substituted styrenes (for example, chlorostyrene, bromostyrene, etc.), and α-alkyl-substituted styrenes having an alkyl group substituted in the a position (for example, α-methylstyrene, etc.), etc. These aromatic vinyl monomers may be used alone or as a combination of two or more. Among these monomers, it is normally preferable to use styrene, vinyl toluene, or α-methylstyrene, etc., and it is in particular preferable to use styrene.

The MFR of the PS-based resin, measured in accordance with the specifications of ISO 1133, is preferably 1-30 g/10 min and more preferably 2-25 g/10 min.

ABS-based resins have, as a main component, a terpolymer of diene-based rubber-aromatic vinyl monomer-vinyl cyanide monomer, and a representative example thereof is a resin or resin composition having an acrylonitrile-butadiene-styrene terpolymer as a main component. Specific examples thereof include: an acrylonitrile-butadiene-styrene terpolymer; and a mixture of an acrylonitrile-butadiene-styrene terpolymer and an acrylonitrile-styrene bipolymer, etc. Among the foregoing, as the ABS-based resin, it is preferable to use an acrylonitrile-butadiene-styrene terpolymer, and it is more preferable to use a mixture of an acrylonitrile-butadiene-styrene terpolymer and an acrylonitrile-styrene bipolymer. In addition to the monomer units described above, the foregoing polymers also include polymers containing a monomer such as α-methylstyrene, vinyl toluene, dimethylstyrene, chlorostyrene, vinylnaphthalene, etc., as a trace component of the styrene-based monomer. Further, the foregoing polymers also include polymers containing a monomer such as methacrylonitrile, ethacrylonitrile, fumaronitrile, etc., as a trace component of the vinyl cyanide monomer. Although the following description does not include a description of the trace component, polymers containing these components in a range that does not hinder the effects of the invention of the present application are also included. The ABS-based resin may be used alone or as a combination of two or more.

The MFR of the ABS-based resin, measured in accordance with the specifications of ISO 1133, is preferably 1-30 g/10 min and more preferably 2-25 g/10 min.

Examples of the polyester-based resins include polyester resins obtained from a polyfunctional glycol and an aromatic polyfunctional carboxylic acid or an aliphatic polyfunctional carboxylic acid, and hydroxycarboxylic acid-based polyester resins, etc. Examples of the polyester resins obtained from a polyfunctional glycol and an aromatic polyfunctional carboxylic acid or an aliphatic polyfunctional carboxylic acid include polyethylene terephthalate, polybutylene terephthalate, polyethylene naphthalate, polybutylene naphthalate, polyethylene adipate, polybutylene adipate, and other copolymers thereof, etc. Examples of the other copolymers thereof include polyester resins obtained by copolymerizing a polyalkylene glycol, polycaprolactone, or the like. Examples of the hydroxycarboxylic acid-based polyester resins include polylactic acid, polyglycolic acid, and polycaprolactone, etc. In the present invention, it is also possible to use a copolymer of the polyester resins described as examples above. The polyester-based resin may be used alone or as a combination of two or more.

The MFR physical properties of the polyester-based resin, measured in accordance with the specifications of ISO 1133, is preferably 1-30 g/10 min and more preferably 2-25 g/10 min.

PC-based resins are resins derived from dihydroxy compounds, and thereamong, a resin derived from an aromatic dihydroxy compound is preferable, in particular, an aromatic dihydroxy compound (bisphenol) in which two aromatic dihydroxy compounds are bonded via a kind of binding group is preferable. For these PC-based resins, it is possible to use a resin manufactured by a publicly-known manufacturing method, and the manufacturing method is not particularly limited. Further, a commercially available resin may also be used. The PC-based resin may be used alone or as a combination of two or more.

The MFR of the PC-based resin, measured in accordance with the specifications of ISO 1133, is preferably 1-30 g/10 min and more preferably 2-25 g/10 min.

The thermoplastic resin (I) preferably includes at least one thermoplastic resin selected from an ABS-based resin and a PC-based resin, and more preferably includes an ABS-based resin. Due to the thermoplastic resin (I) including at least one thermoplastic resin selected from an ABS-based resin and a PC-based resin, and particularly preferably including an ABS-based resin, when combined with the resin (II), the number of points at which molecular chains of the resins entangle with one another increases and it becomes easy to inhibit burrs and fluffs more effectively when punching out is performed.

When the thermoplastic resin (I) includes an ABS-based resin, the ratio of the ABS-based resin is preferably 70-100 mass %, more preferably 75-100 mass %, and particularly preferably 77-100 mass % with respect to the total mass of the thermoplastic resin (I). If the ratio of the ABS-based resin is within the ranges described above, it is possible to effectively inhibit the generation of burrs and fluffs, and moldability is likely to be good.

Further, when the thermoplastic resin (I) includes an ABS-based resin, the ratio of the ABS-based resin in the substrate layer is preferably 70-99 mass % and more preferably 80-98 mass % with respect to the total mass of the resin composition constituting the substrate layer.

(Resin (II))

The resin (II) and is a resin composition including at least one copolymer selected from a (meth)acrylic acid alkyl ester copolymer (A) and a styrene-acrylonitrile copolymer (B) that have a weight-average molecular weight of 700,000-4,300,000. By providing the electronic device packaging sheet according to the present invention with a substrate layer including the thermoplastic resin (I) and a high molecular weight resin (II), it is possible to effectively inhibit the generation of burrs and fluffs.

The Mw of the copolymers (A) and (B) included in the resin (II) is 700,000-4,300,000, preferably 800,000-4,000,000, more preferably 900,000-3,800,000, and particularly preferably 1,000,000-3,500,000. If the Mw of the copolymers (A) and (B) is 700,000-4,300,000, it is possible to effectively inhibit the generation of burrs and fluffs, and film formability also does not readily decrease. Note that the Mw of the copolymers (A) and (B) is a value calculated as a polystyrene-equivalent molecular weight by using gel permeation chromatography (GPC) to calculate a molecular weight in each elution time from a monodisperse polystyrene elution curve.

<Mw Measurement Conditions>

Equipment: Product name "Shodex GPC-101", manufactured by Showa Denko Co., Ltd.

Column: Product name "PLgel 10 μm MIXED-B", manufactured by Polymer Laboratories Mobile phase: Tetrahydrofuran Sample concentration: 0.2 mass %

Temperature: Oven 40° C., injection inlet 35° C., detector 35° C.

Detector: Differential refractometer

<Copolymer (A)>

The copolymer (A) is a (meth)acrylic acid alkyl ester copolymer having an Mw of 700,000-4,300,000. A "(meth) acrylic acid alkyl ester" as described herein indicates acrylic acid alkyl esters and methacrylic acid alkyl esters. The copolymer (A) may be obtained by polymerizing at least two types of (meth)acrylic acid alkyl esters.

Examples of the (meth)acrylic acid alkyl esters constituting the copolymer (A) include (meth)acrylic acid alkyl esters having a linear- or branched-chain alkyl group with a carbon number of 1-12.

The copolymer (A) preferably includes an acrylic acid alkyl ester monomer unit (a1) (hereinafter referred to as the "monomer unit (a1)") having a linear- or branched-chain alkyl group with a carbon number of 4-8. Due to the copolymer (A) including the monomer unit (a1), moldability is likely to be good. Examples of monomers constituting such a monomer unit (a1) include n-butyl acrylate, t-butyl acrylate, isobutyl acrylate, pentyl acrylate, hexyl acrylate, cyclohexyl acrylate, heptyl acrylate, octyl acrylate, and 2-ethylhexyl acrylate, etc. These monomers may be used alone or as a combination of two or more. Thereamong, the copolymer (A) preferably includes n-butyl acrylate or 2-ethylhexyl acrylate as the monomer unit (a1), and more preferably includes an n-butyl acrylate monomer unit.

The ratio of the monomer unit (a1) in the copolymer (A) is preferably 10-50 mass %, more preferably 15-40 mass %, and particularly preferably 20-30 mass % with respect to the total monomer units (100 mass %) constituting the copolymer (A).

The copolymer (A) more preferably includes the monomer unit (a1) and a methacrylic acid alkyl ester monomer unit (a2) having a linear- or branched-chain alkyl group with a carbon number of 1-12. Examples of monomers constituting such a monomer unit (a2) include methyl methacrylate, ethyl methacrylate, n-butyl methacrylate, isobutyl methacrylate, 2-ethylhexyl methacrylate, and cyclohexyl methacrylate, etc. These monomers may be used alone or as a combination of two or more. Thereamong, the copolymer (A) preferably includes a monomer unit of methyl methacrylate or ethyl methacrylate, and more preferably includes a methyl methacrylate monomer unit as the monomer unit (a2).

The mass ratio of the monomer unit (a1) to the monomer unit (a2) (monomer unit (a1)/monomer unit (a2)) in the copolymer (A) is preferably 15/85-40/60, more preferably 20/80-30/70, and particularly preferably 22/78-28/72. If the ratio monomer unit (a1)/monomer unit (a2) is within the ranges described above, film formability and moldability are likely to be good.

The copolymer (A) may also include another monomer unit besides the monomer unit (a1) and monomer unit (a2) described above.

<Copolymer (B)>

The copolymer (B) is a styrene-acrylonitrile copolymer having an Mw of 700,000-4,300,000. The copolymer (B) is obtained by copolymerizing styrene and acrylonitrile. As long as the effects of the present invention are exhibited, the styrene-to-acrylonitrile copolymerization ratio in the copolymer (B) is not particularly limited and may be changed, as appropriate, in accordance with desired physical properties. From the viewpoint of burr inhibition, the copolymerization ratio of styrene to acrylonitrile is, in terms of mass ratio (styrene/acrylonitrile), preferably 90/10-20/80, more preferably 80/20-30/70, and particularly preferably 70/30-40/60.

Examples of styrenes constituting the styrene monomer unit of the copolymer (B) include styrene, alkyl-substituted styrenes (for example, vinyl toluene, vinyl xylene, p-ethylstyrene, p-isopropylstyrene, butylstyrene, p-t-butylstyrene, etc.), halogen-substituted styrenes (for example, chlorostyrene, bromostyrene, etc.), and α-alkyl-substituted styrenes having an alkyl group substituted in the a position (for example, α-methylstyrene, etc.), etc. These styrenes may be used alone or as a combination of two or more. Thereamong, styrene and vinyl toluene are preferable, with styrene being more preferable.

The resin (II) includes at least one copolymer selected from the copolymer (A) and the copolymer (B) described above. Thereamong, the resin (II) preferably includes the copolymer (A) or the copolymer (B), and more preferably includes the copolymer (A). In one preferred embodiment, the resin (II) may be configured from the copolymer (A) alone.

When the resin (II) includes the copolymer (A), the ratio thereof is preferably 50-100 mass %, more preferably 60-100 mass %, and particularly preferably 70-100 mass % with respect to the total mass of the resin (II). Further, the ratio of the copolymer (A) in the substrate sheet is preferably 0.5-30 mass % and more preferably 2-25 mass % with respect to the total mass of the resin composition constituting the substrate sheet.

When the resin (II) includes the copolymer (B), the ratio thereof is preferably 30-100 mass %, more preferably 40-100 mass %, and particularly preferably 50-100 mass % with respect to the total mass of the resin (II). Further, the ratio of the copolymer (B) in the substrate sheet is preferably 0.3-30 mass % and more preferably 1-25 mass % with respect to the total mass of the resin composition constituting the substrate sheet.

Because the resin composition constituting the substrate layer includes the thermoplastic resin (I) and the resin (II), the sheet according to the present invention has improved sheet strength and it is possible to inhibit the resin from being stretched when the sheet is punched out. As a result thereof, it is possible to effectively inhibit the generation of fluffs and burrs. The substrate layer may be configured from a resin composition including only the thermoplastic resin (I) and the resin (II).

There is at least one substrate layer included in the substrate sheet, and there may be two or more substrate layers. When there are two or more substrate layers, the ratios of the thermoplastic resin (I) and the resin (II) included in the individual substrates layer may all be the same and may be different. From the viewpoint that winding creases are not readily created in the sheet and moldability is likely to be good, it is preferable for the constitutions of individual substrate layers to be the same.

The substrate sheet may be configured from the substrate layer alone. In that case, the thickness of the substrate layer is the thickness of the substrate sheet. When the substrate sheet is configured from one substrate layer, from the viewpoint of moldability and film formability of the electronic device packaging sheet, the thickness of the substrate layer is preferably 50-700 µm and more preferably 100-500 µm.

When the substrate sheet is a multilayer substrate sheet having two or more substrate layers laminated therein, the number of substrate layers included in the substrate sheet is preferably 2-70 and more preferably 3-50. In that case, the average value of the thickness of an individual substrate layer is preferably 2-200 µm, more preferably 3-100 µm, and particularly preferably 5-50 µm. Note that the "average value of the thickness of an individual substrate layer" indicates a value obtained by dividing the total thickness of the substrate layers included in the substrate sheet by the total number of laminated substrate layers. That is, when "x1" is the thickness of one substrate layer, the "average value of the thickness of an individual substrate layer" means a value calculated by (x1+x2+x3+ . . . +xn)/n. Here, "n" indicates the total number of substrate layers laminated in the substrate sheet.

When the substrate sheet is provided with two or more substrate layers, there may also be provided a dividing layer which divides the substrate layers.

<Dividing Layer>

The substrate sheet of the electronic device packaging sheet according to the present invention may also be provided with a dividing layer. The dividing layer is a layer that divides two or more substrate layers and is preferably disposed between adjacent substrate layers. In one embodiment, the substrate sheet may have a configuration in which the substrate layers and dividing layers are alternately laminated.

The dividing layer preferably includes, as a main component, a thermoplastic resin different from the thermoplastic resin (I) included in the substrate layer. Here, "includes, as a main component" means including a thermoplastic resin at 50 mass % or more with respect to the total mass of the resin composition constituting the dividing layer. Further, a "thermoplastic resin different from the thermoplastic resin (I)" includes not only thermoplastic resins which differ in terms of thermoplastic resin type but also thermoplastic resins which differ in terms of the physical properties thereof. That is, the dividing layer may include, as a main component, a thermoplastic resin differing in type from the thermoplastic resin (I), and may include, as a main component, a thermoplastic resin which is the same as the resin (I) but has different physical properties. From the viewpoint of burr inhibition, the thermoplastic resin included in the dividing layer preferably includes, as a main component, a thermoplastic resin differing in type from the thermoplastic resin (I).

Examples of the thermoplastic resin included in the dividing layer include the same thermoplastic resin as the thermoplastic resin (I) described above. When the thermoplastic resin (I) includes an ABS-based resin, the thermoplastic resin included in the dividing layer is preferably at least one thermoplastic resin selected from a PC-based resin and a polyester-based resin, and more preferably includes a PC-based resin. Further, when the thermoplastic resin (I) includes an ABS-based resin, the thermoplastic resin included in the dividing layer may be an acrylonitrile-styrene bipolymer.

Examples of the styrene constituting the styrene monomer unit of the acrylonitrile-styrene bipolymer include the same examples described for the copolymer (B) above.

In one embodiment, when the dividing layer includes a PC-based resin, the ratio thereof is preferably 50-100 mass %, more preferably 60-100 mass %, and particularly preferably 70-100 mass % with respect to the total mass of the resin composition constituting the dividing layer. Further, the PC-based resin more preferably has an MFR, measured in accordance with the specifications of ISO 1133, of 1-30 g/10 min.

When the substrate sheet is provided with a dividing layer, the number of dividing layers may be adjusted depending on the number of laminated substrate layers. That is, when there are 2-35 substrate layers, there are preferably 1-34 dividing layers.

When there are two or more dividing layers, the resin constitutions of individual dividing layers may be different or may be the same. From the viewpoint of film formability, it is preferable for the resin constitutions of individual dividing layers to be the same.

Further, when there are two or more dividing layers, the thicknesses of individual dividing layers may be the same or may be different. In one embodiment, the average value of the thickness of an individual dividing layer is preferably equal to or less than the average value of the thickness of an individual substrate layer (that is, the average value of the thickness of an individual substrate layer is preferably equal to or greater than the average value of the thickness of an individual dividing layer). When the average values of the thicknesses of individual dividing layers and substrate layers satisfy the relationship described above, it becomes easy to inhibit the generation of burrs and fluffs more effectively. Note that the "average value of the thickness of an individual dividing layer" is the same as that described above with respect to the substrate layer. That is, the "average value of the thickness of an individual dividing layer" indicates a value obtained by dividing the total thickness of the dividing layers included in the substrate sheet by the number of dividing layers laminated. In one embodiment, the average value of the thickness of an individual dividing layer is preferably 2-200 μm, more preferably 3-100 μm, and particularly preferably 5-50 μm.

Although the upper limit thereof is not particularly limited, from the viewpoint of film formability, the average value of the thickness of an individual substrate layer is preferably no more than ten times the average value of the thickness of an individual dividing layer.

It is inferred that burrs and fluffs generated when a sheet is molded are generated due to the resin being stretched during slitting or punching out of the sheet. The present inventors discovered that by providing a substrate layer in which the high molecular weight resin (II) is combined with the thermoplastic resin (I), the number of points at which molecular chains of the resin (I) entangle with one another increases, stretching of the resin during molding is inhibited, and it is possible to inhibit the generation of burrs and fluffs effectively. Further, since sheet strength is also excellent, the substrate layer can inhibit the resin from being stretched when punching out of the sheet is performed. The present inventors also discovered that by configuring a substrate sheet having a multilayer structure which has a plurality of substrate layers having such a configuration laminated therein, and further, which has a dividing layer provided between adjacent substrate layers, it becomes easy to inhibit the generation of burrs and fluffs more effectively.

The sheet according to the present invention preferably has a yield point stress, measured at a speed of 67 mm/sec in accordance with the JIS K 7127 tensile test, of 30-80 MPa.

When the substrate sheet is provided with two or more substrate layers and a dividing layer, the total number of these laminated substrate layers and dividing layers is preferably 3-70, more preferably 3-50, and even more preferably 5-40.

From the viewpoint of moldability and strength when configured as a carrier tape, the thickness of the substrate sheet is preferably 50-700 μm, more preferably 75-600 μm, and particularly preferably 90-450 μm.

The electronic device packaging sheet according to the present invention may be configured solely from the substrate sheet described above. When the electronic device packaging sheet according to the present invention is to be configured as a conductive sheet, a conductive layer may be formed on at least one surface of the substrate sheet. Further, an optional layer (for example, an anti-fouling layer, etc.) may also be provided on the substrate sheet.

(Conductive Layer)

The electronic device packaging sheet according to the present invention may be provided with a conductive layer on at least one surface of the substrate sheet. The conductive layer is a layer configured from a resin composition including a conductive component.

As long as the effects of the present invention are exhibited, there are no particular limitations for the resin composition constituting the conductive layer. Examples thereof include a resin composition which includes the thermoplastic resin described above at 65-95 mass % and preferably 70-90 mass %, and a conductive agent such as carbon black, or the like, at 5-35 mass % and preferably 10-30 mass % with respect to the total mass of the resin composition.

Examples of the carbon black include furnace black, channel black, and acetylene black, etc., and the carbon black preferably has a large specific surface area and provides high conductivity with a small amount thereof added. Specifically, the carbon black preferably has an average primary particle diameter of 20-100 nm and more preferably 20-65 nm. The average primary particle diameter means an average diameter of particles measured by using a transmission electron microscope.

When a conductive layer is provided, the thickness thereof is not particularly limited. From the viewpoint that the mechanical strength of the electronic device packaging sheet is easily improved, the thickness of the conductive layer is preferably 3-100 μm and more preferably 10-50 μm.

[Method for Producing Electronic Device Packaging Sheet]

A conventional and publicly-known production method may be employed as a method for producing the electronic device packaging sheet according to the present invention. An example thereof includes a method comprising using a mixer to mix a resin composition including the thermoplastic resin (I) and the resin (II) at desired resin ratios to prepare a resin composition for forming the substrate layer, then supplying this resin composition to an extruder, melt-kneading, and forming the substrate layer by using a feed block method, etc., to form a film with a desired thickness. When two or more substrate layers are to be provided, a substrate sheet with a multilayer structure can be configured by using the same method to film-form a substrate layer and laminating on the first substrate layer. Further, when a dividing layer is to be provided between substrate layers, a resin composition for the dividing layer is to be prepared in advance, supplied to another extruder, and melt-kneaded. Thereafter, a substrate sheet having a multilayer structure provided with substrate layers and dividing layers can be obtained by alternately laminating the substrate layers and dividing layers so as to lie one another. When the electronic device packaging sheet according to the present invention is to be configured as a conductive sheet, the electronic device packaging sheet can be configured by laminating a resin composition for forming a conductive layer on one surface or both surfaces of the substrate sheet, said resin composition having been melt-kneaded with another extruder.

[Molded Article]

The electronic device packaging sheet according to the present invention can be configured as a molded article by being molded using a publicly-known method such as vacuum molding, pressure molding, and press-molding, etc. Preferred examples of the molded article of the electronic device packaging sheet include containers for accommodating electronic devices, carrier tapes (embossed carrier tapes), etc. The electronic device packaging sheet according to the present invention can be used to obtain molded articles in which the generation of cross-sectional fluffs and burrs when the sheet is slit and when sprocket holes, etc., are punched out is extremely low. The electronic device packaging sheet according to the present invention is extremely useful for embossing carrier tapes. In addition, by using the foregoing molding techniques and secondary processing, it is possible to produce embossed carrier tapes which have excellent dimensional accuracy in slit width, punched-out hole diameter etc., and which significantly inhibit the generation of burrs when punching out is performed.

More specifically, in secondary processing steps of slitting and punching out carried out on an embossed carrier tape, etc., which is a molded article of the electronic device packaging sheet according to the present invention, it is possible to obtain sprocket holes which have hole dimensional stability and in which the generation of fluffs and burrs is significantly inhibited for punching out process conditions wherein pin/die one side clearance is a constant wide range between 5-50 μm and punching out speed is in a wide range of 10-300 mm/sec. Further, in a slitting step using a ring-shaped combination blade, too, it is possible to obtain slit edge surfaces which have sheet width stability and no fluffs or burrs.

The container and embossed carrier tape according to the present invention can be used in the storage and transportation of electronic devices as a carrier tape body in which an electronic device is accommodated in an accommodation section formed by the molding method described above and which is then covered with a cover tape and wound up in a reel form.

A more preferable embodiment of the electronic device packaging sheet according to the present invention is an electronic device packaging sheet including a substrate sheet provided with at least one substrate layer comprising a thermoplastic resin (I) including an ABS-based resin and a resin (II) including a (meth)acrylic acid alkyl ester copolymer (A) having an Mw of 700,000-4,300,000, wherein the mass ratio of the thermoplastic resin (I) to the resin (II) (resin (I)/resin (II)) in the substrate layer is 98/2-75/25. The substrate sheet may be provided with two or more of the substrate layers, and a dividing layer may be disposed between the substrate layers. The dividing layer preferably includes a PC-based resin as a main component. The copolymer (A) preferably includes the monomer unit (a1) and the monomer unit (a2).

EXAMPLES

The present invention shall be explained in more detail below by providing examples, but the present invention is not limited by the following descriptions.
[Fabrication of Electronic Device Packaging Sheet]

Examples 1-9 and Comparative Examples 1-5

Each of the raw materials shown for the constitution of the substrate layers in Tables 1 and 2 was weighed so as to achieve the composition ratios (mass %) shown therein, the raw materials were rendered to a homogeneous mixture with a high-speed mixer, then kneaded by using a φ30 mm vented twin extruder and pelletized by a strand cutting method to obtain respective resin compositions for forming the substrate layers. Further, for the conductive layer, resin compositions obtained by using a φ45 mm vented twin extruder to knead 80 mass % of a polycarbonate resin (product name "Panlite® L-1225L", manufactured by Teijin Ltd.) and 20 mass % of acetylene black (product name "Denka Black® granular", manufactured by Denka Co. Ltd., average primary particle diameter: 35 nm) and pelletizing by a strand cutting method were used.

Using these resin compositions, a conductive layer was formed on both surfaces of the substrate layer by a feed block method using a φ65 mm extruder (L/D=28), a φ40 mm extruder (L/D=26), and a T-die with a width of 500 mm to obtain an electronic device packaging sheet. Note that the thickness of the substrate sheet was 160 μm and the thickness of an individual conductive layer was 20 μm.

Example 10

Each of the raw materials shown for the constitution of the substrate layer in Table 1 was weighed so as to achieve the composition ratios (mass %) shown therein, and a resin composition for forming the substrate layer was obtained by the same method as Example 1. Using this resin composition, a single layer substrate sheet was fabricated by a feed block method using a φ65 mm extruder (L/D=28) and a T-die with a width of 500 mm. Note that the thickness of the substrate sheet was 200 μm.

Examples 11-13

Examples 11-13 are examples in which a dividing layer was disposed between adjacent substrate layers.

First, each of the raw materials shown for the constitution of the substrate layer in Table 1 was weighed so as each to achieve the composition ratios (mass %) shown therein, and resin compositions for forming the substrate layers were obtained by the same method as Example 1. Further, for the conductive layer, a conductive layer resin composition having the same constitution as that in Example 1 was prepared. Furthermore, a polycarbonate resin (product name "Panlite® L-1225L", manufactured by Teijin Ltd.) was prepared for use in the dividing layer that divides the substrate layers. Electronic device packaging sheets were obtained by using these resin compositions and forming, by a feed block method using a φ65 mm extruder (L/D=28), a φ50 mm extruder (L/D=28), a φ40 mm extruder (L/D=26), and a T-die with a width of 500 mm, a conductive layer on both surfaces of a substrate sheet in which substrate layers and dividing layers were laminated so as to achieve the thickness described in Table 1. Note that the thickness of the substrate sheet was 160 μm and the thickness of an individual conductive layer was 20 μm. The configuration of the electronic device packaging sheet in each example is as described below.
<Configuration of Electronic Device Packaging Sheet in Each Example>
Examples 11, 13, 14: conductive layer/(substrate layer/dividing layer/substrate layer)/conductive layer
Example 12: conductive layer/(substrate layer/dividing layer/substrate layer/dividing layer/substrate layer/dividing layer/substrate layer)/conductive layer

Example 14

Each of the raw materials shown for the constitution of the substrate layer in Table 1 was weighed so as to achieve the composition ratios (mass %) shown therein, and a resin composition for forming the substrate layer was obtained by the same method as Example 1. Further, for the dividing layer, a dividing layer resin composition having the same constitution as that in Example 11 was prepared. Using these resin compositions, a substrate sheet having a substrate layer/dividing layer/substrate layer-laminated structure was fabricated by disposing a dividing layer between adjacent substrate layers by a feed block method using a φ65 mm extruder (L/D=28), a φ40 mm extruder (L/D=26), and a T-die with a width of 500 mm. Note that the thickness of the substrate sheet was 200 μm, and the thickness of the substrate layers after division and the thickness of the dividing layer were as shown in Table 1.

The details of the raw materials shown in Table 1 are as described below.

(Thermoplastic Resin (I))

Acrylonitrile-butadiene-styrene copolymer (ABS): product name "SE-10", manufactured by Denka Co., Ltd.

Polycarbonate resin (PC): product name "Panlite® L-1225L", manufactured by Teijin Ltd.

High-impact polystyrene resin (HIPS): product name "E640N", manufactured by Toyo-Styrene Co., Ltd.

(Resin (II))

<Copolymer (A)> a-1: Copolymer of methyl methacrylate and n-butyl acrylate: product name "Metablen® P-551A" (Mw: 3,000,000), manufactured by Mitsubishi Chemical Corporation a-2: Copolymer of methyl methacrylate and n-butyl acrylate: product name "Metablen® P-530A" (Mw: 1,500,000), manufactured by Mitsubishi Chemical Corporation a-3: Copolymer of methyl methacrylate and ethyl acrylate (mass ratio 60/40) (Mw: 3,000,000), Denka Co., Ltd. polymerized product <Copolymer (A')> a-4: Copolymer of methyl methacrylate and n-butyl acrylate: (mass ratio 60/40) (Mw: 400,000), Denka Co., Ltd. polymerized product a-5: Copolymer of methyl methacrylate and n-butyl acrylate: product name "Metablen® P-531A" (Mw: 4,500,000), manufactured by Mitsubishi Chemical Corporation <Copolymer (B)> b-1: Styrene-acrylonitrile copolymer: product name "Metablen P-1500" (Mw: 4,000,000), manufactured by Mitsubishi Chemical Corporation <Copolymer (B')> b-2: Styrene-acrylonitrile copolymer: product name "AS-C-800" (Mw: 180,000), manufactured by Denka Co., Ltd.

b-3: Styrene-acrylonitrile copolymer (mass ratio 75/25) (Mw: 6,000,000), Denka Co., Ltd. polymerized product Note that the Mw of the resin (II) described above is a value calculated as a polystyrene-equivalent molecular weight by using gel permeation chromatography (GPC) to calculate a molecular weight in each elution time from a monodisperse polystyrene elution curve.

<Mw Measurement Conditions>

Equipment: Product name "Shodex GPC-101", manufactured by Showa Denko Co., Ltd.

Column: Product name "PLgel 10 μm MIXED-B", manufactured by Polymer Laboratories Mobile phase: Tetrahydrofuran Sample concentration: 0.2 mass %

Temperature: oven 40° C., injection inlet 35° C., detector 35° C.

Detector: Differential refractometer

Further, the average primary particle diameter of acetylene black in the conductive layer is a value determined by the method described below.

First, a dispersion sample was prepared by using an ultrasonic disperser to disperse acetylene black in chloroform for 10 minutes under conditions of 150 kHz and 0.4 kW. This dispersion sample was sprinkled and fixed on a carbon-reinforced support film, and an image thereof was then captured with a transmission electron microscope (JEM-2100, manufactured by JEOL Ltd). 1,000 or more particle diameters (maximum diameter for shapes other than a sphere) of an inorganic filler were measured randomly by using an Endter device from an image magnified to 50,000-200,000 times, and the average value thereof was used as the average primary particle diameter.

[Evaluation of Electronic Device Packaging Sheet]

The electronic device packaging sheets obtained in each of the examples were cut in the extrusion direction of the sheets to fabricate sheet samples which were left for 24 hours in an environment with a temperature of 23° C. and a relative humidity of 50%. Thereafter, film formability and punching-out burr properties were evaluated under the conditions described below.

(1) Film Formability

As an evaluation of sheet film-formability, an evaluation of sheet property uniformity was made. The modulus of elasticity of the sheet samples was measured, at a speed of 5 mm/min in an environment with a temperature of 23° C. and a relative humidity of 50%, by using a tensile tester (product name "Strograph VE-1D", manufactured by Toyo Seiki Seisaku-sho, Ltd.) in accordance with JIS-K-7127 (1999), with the flow direction of the sheets defined as the length direction and test piece types sampled from three locations—left edge, center, and right edge—in the width direction (direction orthogonal to the length direction). The difference between the average value and the largest value of the modulus of elasticity for the three locations (largest value–average value) and the difference between the average value and the smallest value of the same (average value–smallest value) were obtained, the larger of the foregoing differences was divided by the average value to obtain a tolerance (%), and a determination was made using the following determination criteria. In the following determination criteria, good or higher was deemed to be a pass (sheet having high uniformity and good film-formability).

<Determination Criteria>

Excellent: Sheet having a thickness and modulus of elasticity tolerance of less than 10% (uniformity of sheet is extremely high)

Good: Sheet having a thickness and modulus of elasticity tolerance of 10% or more and less than 20% (uniformity of sheet is high)

Fail: Sheet having a thickness and modulus of elasticity tolerance of 20% or more (sheet is non-uniform)

(2) Punching-Out Burr Properties

A vacuum rotary former (product name "CT 8/24", manufactured by Mühlbauer) was used to perform punching-out in sheet samples slit into 8 mm widths in an environment with a temperature of 23° C. and a relative humidity of 50%, and burrs and fluffs around punched-out holes were evaluated. Note that punching-out was performed at a speed of 240 m/h using a punching-out device provided with a cylindrical punching-out pin with a sprocket hole pin tip diameter of 1.5 mm and a die hole with a diameter of 1.58 mm.

An image of the punched-out hole formed in the sheet described above was captured, in an illumination environment with an epi-illumination of 0%, transmission of 40%, and a ring of 0%, by using a measuring microscope (product name "MF-A1720H (image unit 6D)", manufactured by Mitutoyo Corporation). Holes with a diameter of 1.5 mm were observed at ten locations and the number of burrs and fluffs with a length of 0.15 mm or more was counted. Further, evaluations were made in accordance with the following determination criteria, with good or higher being deemed to be a pass (generation of burrs and fluffs is inhibited).

<Determination Criteria>

Excellent: Number of burrs, fluffs was less than six

Good: Number of burrs, fluffs was six or more and less than ten

Fail: Number of burrs, fluffs was ten or more

TABLE 1

| | | | | | Example 1 | Example 2 | Example 3 | Example 4 | Example 5 | Example 6 | Example 7 |
|---|---|---|---|---|---|---|---|---|---|---|---|
| Substrate sheet | Substrate layer | Thermoplastic resin (I) | ABS | (mass %) | 90 | 90 | 90 | 90 | | 75 | 98 |
| | | | PC | | | | | | 90 | | |
| | | | HIPS | | | | | | | | |
| | | Resin (II) | Copolymer (A) a-1 | | 10 | | | | 10 | 25 | 2 |
| | | | a-2 | | | 10 | | | | | |
| | | | a-3 | | | | 10 | | | | |
| | | | Copolymer (A') a-4 | | | | | | | | |
| | | | a-5 | | | | | | | | |
| | | | Copolymer (B) b-1 | | | | | 10 | | | |
| | | | Copolymer (B') b-2 | | | | | | | | |
| | | | b-3 | | | | | | | | |
| | | No. of substrate layers laminated | | (—) | 1 | 1 | 1 | 1 | 1 | 1 | 1 |
| | | Average value of thickness of individual substrate layer | | (µm) | 160 | 160 | 160 | 160 | 160 | 160 | 160 |
| | Dividing layer | Dividing layer (Y/N) | | (—) | N | N | N | N | N | N | N |
| | | No. of dividing layers laminated | | | — | — | — | — | — | — | — |
| | | Average value of thickness of individual dividing layer | | (µm) | — | — | — | — | — | — | — |
| | | Thickness of substrate sheet | | (µm) | 160 | 160 | 160 | 160 | 160 | 160 | 160 |
| Conductive layer | Configuration | Conductive layer (both surfaces) (Y/N) | | (—) | Y | Y | Y | Y | Y | Y | Y |
| | | Average value of thickness of individual conductive layer | | (µm) | 20 | 20 | 20 | 20 | 20 | 20 | 20 |
| Total thickness of electronic device packaging sheet | | | | (µm) | 200 | 200 | 200 | 200 | 200 | 200 | 200 |
| Evaluated property | Film formability | | | | Excellent | Excellent | Excellent | Excellent | Excellent | Excellent | Excellent |
| | Punching-out burr properties | | | | Excellent | Excellent | Good | Excellent | Excellent | Excellent | Excellent |
| | (No. of burrs) | | | | 4 | 3 | 7 | 2 | 2 | 3 | 5 |

| | | | | | Example 8 | Example 9 | Example 10 | Example 11 | Example 12 | Example 13 | Example 14 |
|---|---|---|---|---|---|---|---|---|---|---|---|
| Substrate sheet | Substrate layer | Thermoplastic resin (I) | ABS | (mass %) | 70 | 95 | 90 | 90 | 90 | 90 | 90 |
| | | | PC | | 20 | | | | | | |
| | | | HIPS | | | 5 | | | | | |
| | | Resin (II) | Copolymer (A) a-1 | | 10 | 10 | 10 | 10 | 10 | 10 | 10 |
| | | | a-2 | | | | | | | | |
| | | | a-3 | | | | | | | | |
| | | | Copolymer (A') a-4 | | | | | | | | |
| | | | a-5 | | | | | | | | |
| | | | Copolymer (B) b-1 | | | | | | | | |
| | | | Copolymer (B') b-2 | | | | | | | | |
| | | | b-3 | | | | | | | | |
| | | No. of substrate layers laminated | | (—) | 1 | 1 | 1 | 2 | 4 | 2 | 2 |
| | | Average value of thickness of individual substrate layer | | (µm) | 160 | 160 | 200 | 65 | 29.5 | 40 | 80 |

TABLE 1-continued

| | | | | | | | | | | |
|---|---|---|---|---|---|---|---|---|---|---|
| | Dividing layer | Dividing layer (Y/N) | (—) | N | N | N | Y | Y | Y | Y |
| | | No. of dividing layers laminated | | — | — | — | 1 | 3 | 1 | 1 |
| | | Average value of thickness of individual dividing layer | (µm) | — | — | — | 30 | 14 | 80 | 40 |
| | Thickness of substrate sheet | | (µm) | 160 | 160 | 200 | 30 | 14 | 80 | 40 |
| Conductive layer | Configuration | Conductive layer (both surfaces) (Y/N) | (—) | Y | Y | N | Y | Y | Y | N |
| | | Average value of thickness of individual conductive layer | (µm) | 20 | 20 | — | 20 | 20 | 20 | — |
| Total thickness of electronic device packaging sheet | | | (µm) | 200 | 200 | 200 | 200 | 200 | 200 | 160 |
| Evaluated property | Film formability | | | Excellent | Excellent | Excellent | Excellent | Excellent | Excellent | Excellent |
| | Punching-out burr properties | | | Excellent | Excellent | Excellent | Excellent | Excellent | Good | Excellent |
| | (No. of burrs) | | | 3 | 4 | 4 | 2 | 1 | 6 | 3 |

TABLE 2

| | | | | | | Comp Ex 1 | Comp Ex 2 | Comp Ex 3 | Comp Ex 4 | Comp Ex 5 |
|---|---|---|---|---|---|---|---|---|---|---|
| Substrate sheet | Substrate layer | Thermoplastic resin (I) | ABS | | (mass %) | 100 | 90 | 90 | 90 | 90 |
| | | | PC | | | | | | | |
| | | | HIPS | | | | | | | |
| | | Resin (II) | Copolymer (A) | a-1 | | | | | | |
| | | | | a-2 | | | | | | |
| | | | | a-3 | | | | | | |
| | | | Copolymer (A') | a-4 | | | 10 | | | |
| | | | | a-5 | | | | 10 | | |
| | | | Copolymer (B) | b-1 | | | | | | |
| | | | Copolymer (B') | b-2 | | | | | 10 | |
| | | | | b-3 | | | | | | 10 |
| | | No. of substrate layers laminated | | | (—) | 1 | 1 | 1 | 1 | 1 |
| | | Average value of thickness of individual substrate layer | | | (µm) | 160 | 160 | 160 | 160 | 160 |
| | Dividing layer | Dividing layer (Y/N) | | | (—) | N | N | N | N | N |
| | | No. of dividing layers laminated | | | | — | — | — | — | — |
| | | Average value of thickness of individual dividing layer | | | (µm) | — | — | — | — | — |
| | Thickness of substrate sheet | | | | (µm) | 160 | 160 | 160 | 160 | 160 |
| Conductive layer | Configuration | Conductive layer (both surfaces) (Y/N) | | | (—) | Y | Y | Y | Y | Y |
| | | Average value of thickness of individual conductive layer | | | (µm) | 20 | 20 | 20 | 20 | 20 |
| Total thickness of electronic device packaging sheet | | | | | (µm) | 200 | 200 | 200 | 200 | 200 |
| Evaluated property | Film formability | | | | | Excellent | Excellent | Fail | Excellent | Fail |
| | Punching-out burr properties | | | | | Fail | Fail | — | Fail | — |
| | (No. of burrs) | | | | | 16 | 14 | — | 13 | — |

As shown in Table 1, it was discovered that the electronic device packaging sheets of Examples 1-14, which satisfy the configuration of the present invention, can effectively inhibit the generation of fluffs and burrs when punching-out is performed on the sheets. Meanwhile, as shown in Table 2, in the electronic device packaging sheets of Comparative Examples 1, 2, and 4, which do not satisfy the configuration of the present invention, many burrs or fluffs were generated. Further, in Comparative Examples 3 and 5, which include a copolymer having an Mw greater than 4,300,000, film formability was poor and it was not possible to obtain a uniform sheet. From the above results, it was confirmed that the electronic device packaging sheet according to the present invention can effectively inhibit the generation of burrs and fluffs.

The invention claimed is:

1. An electronic device packaging sheet comprising a substrate sheet having at least one substrate layer comprising: a thermoplastic resin (I); and a resin (II) which comprises at least one copolymer selected from a (meth)acrylic acid alkyl ester copolymer (A) and a styrene-acrylonitrile copolymer (B) that have a weight-average molecular weight of 700,000-4,300,000.

2. The electronic device packaging sheet according to claim 1, wherein the substrate sheet has at least one substrate layer comprising the thermoplastic resin (I) at 70-99 mass % and the resin (II) at 1-30 mass %.

3. The electronic device packaging sheet according to claim 2, wherein the (meth)acrylic acid alkyl ester copolymer (A) comprises an acrylic acid alkyl ester monomer unit (a1) having an alkyl group with a carbon number of 4-8.

4. The electronic device packaging sheet according to claim 2, wherein the thermoplastic resin (I) comprises at least one thermoplastic resin selected from an ABS-based resin and a PC-based resin.

5. The electronic device packaging sheet according to claim 2, wherein the thermoplastic resin (I) comprises an ABS-based resin at 70-100 mass % with respect to the total mass of the thermoplastic resin (I).

6. The electronic device packaging sheet according to claim 2, wherein the substrate sheet has at least one dividing layer which divides the substrate layer.

7. The electronic device packaging sheet according to claim 1, wherein the (meth)acrylic acid alkyl ester copolymer (A) comprises an acrylic acid alkyl ester monomer unit (a1) having an alkyl group with a carbon number of 4-8.

8. The electronic device packaging sheet according to claim 7, wherein the thermoplastic resin (I) comprises at least one thermoplastic resin selected from an ABS-based resin and a PC-based resin.

9. The electronic device packaging sheet according to claim 7, wherein the thermoplastic resin (I) comprises an ABS-based resin at 70-100 mass % with respect to the total mass of the thermoplastic resin (I).

10. The electronic device packaging sheet according to claim 7, wherein the substrate sheet has at least one dividing layer which divides the substrate layer.

11. The electronic device packaging sheet according to claim 1, wherein the thermoplastic resin (I) comprises at least one thermoplastic resin selected from an ABS-based resin and a PC-based resin.

12. The electronic device packaging sheet according to claim 11, wherein the thermoplastic resin (I) comprises an ABS-based resin at 70-100 mass % with respect to the total mass of the thermoplastic resin (I).

13. The electronic device packaging sheet according to claim 11, wherein the substrate sheet has at least one dividing layer which divides the substrate layer.

14. The electronic device packaging sheet according to claim 1, wherein the thermoplastic resin (I) comprises an ABS-based resin at 70-100 mass % with respect to the total mass of the thermoplastic resin (I).

15. The electronic device packaging sheet according to claim 14, wherein the substrate sheet has at least one dividing layer which divides the substrate layer.

16. The electronic device packaging sheet according to claim 1, wherein the substrate sheet has at least one dividing layer which divides the substrate layer.

17. The electronic device packaging sheet according to claim 16, wherein the average value of the thickness of an individual substrate layer is equal to or greater than the average value of the thickness of an individual dividing layer.

18. A molded article comprising the electronic device packaging sheet according to claim 1.

19. The molded article according to claim 18, wherein the molded article is a container.

20. The molded article according to claim 18, wherein the molded article is a carrier tape.

* * * * *